United States Patent
Newberg et al.

(10) Patent No.: US 7,145,504 B1
(45) Date of Patent: Dec. 5, 2006

(54) ARBITRARY RADAR TARGET SYNTHESIZER (ARTS)

(75) Inventors: Irwin L. Newberg, Pacific Palisades, CA (US); John K. Keigharn, Rancho Palos Verdes, CA (US); Jonathan D. Gordon, Hermosa Beach, CA (US); Garin S. Bircsak, No. Hollywood, CA (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 10/800,053

(22) Filed: Mar. 11, 2004

(51) Int. Cl.
*G01S 7/40* (2006.01)

(52) U.S. Cl. .................. 342/169; 342/165; 342/195

(58) Field of Classification Search ............. 342/169, 342/170, 171
See application file for complete search history.

(56) References Cited

U.S. PATENT DOCUMENTS

| | | | | |
|---|---|---|---|---|
| 4,199,874 A * | 4/1980 | Koshevoi et al. | ............... | 434/2 |
| 4,450,447 A * | 5/1984 | Zebker et al. | ............... | 342/171 |
| 4,903,029 A | 2/1990 | Newberg et al. | | |
| 5,160,264 A * | 11/1992 | Banura et al. | ............... | 434/2 |
| 5,166,691 A * | 11/1992 | Chin et al. | .................. | 342/165 |
| 5,177,488 A | 1/1993 | Wang et al. | | |
| 5,223,840 A * | 6/1993 | Cronyn | ....................... | 342/170 |
| 5,339,087 A * | 8/1994 | Minarik | ...................... | 342/375 |
| 5,457,463 A * | 10/1995 | Vencel et al. | ................ | 342/169 |
| 5,518,400 A * | 5/1996 | Otoide et al. | .................. | 434/4 |
| 5,892,479 A * | 4/1999 | Mills et al. | .................. | 342/172 |
| 5,973,638 A * | 10/1999 | Robbins et al. | ............. | 342/172 |
| 6,075,480 A * | 6/2000 | Deliberis, Jr. | .............. | 342/169 |
| 6,236,363 B1 * | 5/2001 | Robbins et al. | ............. | 342/360 |
| 6,346,909 B1 * | 2/2002 | Johnson et al. | ............. | 342/169 |
| 6,384,771 B1 * | 5/2002 | Montague et al. | .......... | 342/170 |
| 6,492,939 B1 * | 12/2002 | Fredericks et al. | ......... | 342/172 |
| 6,498,583 B1 * | 12/2002 | Tsai et al. | ................... | 342/169 |
| 2004/0201518 A1 * | 10/2004 | Pace et al. | ................. | 342/169 |

\* cited by examiner

*Primary Examiner*—Thomas H. Tarcza
*Assistant Examiner*—Matthew Barker
(74) *Attorney, Agent, or Firm*—Leonard A. Alkov; Karl A. Vick

(57) ABSTRACT

A system for generating a simulated radar return signal. The novel system includes a processor adapted to receive target and waveform parameters and in accordance therewith generate a composite digital signal, and a digital to analog converter adapted to convert the digital signal to an analog signal. The system also includes an upconverter adapted to convert the analog signal to radio frequency. The processor calculates time-domain digital data samples representing a composite radar return waveform based on the target and waveform parameters. These data samples are output at each time interval that the digital to analog converter samples data. The composite waveform can include returns from a large number of targets and from targets embedded in clutter. The system can also be adapted to test a radar system having multiple antenna ports by replicating the basic design for each port.

5 Claims, 4 Drawing Sheets

ARBITRARY RADAR TARGET SYNTHESIZER (ARTS)

BACKGROUND OF THE INVENTION

1. Field of the Invention

The present invention relates to radar systems. More specifically, the present invention relates to systems and methods for generating simulated radar return signals for radar testing and mode development.

2. Description of the Related Art

Modern radar systems need to be tested and calibrated under controlled conditions. One type of radar test system, often known as a target simulator, generates simulated return signals that the radar might receive in the field and applies them to the radar to test its performance.

Conventional target simulators are typically very hardware intensive. In order to simulate a single target, a conventional target simulator requires RF (radio frequency) hardware to generate or receive a radar transmit waveform, mix the transmit signal with an appropriate Doppler frequency (dependant on the simulated target's velocity relative to the radar), and add an appropriate delay (dependant on the simulated target's range). When simulating multiple targets, each target is generated separately and thus each added target needs additional RF hardware. The system can therefore become very large and expensive when several targets need to be simulated.

Furthermore, an important function of modern radars is the ability to find targets embedded in clutter (unwanted return signals from objects within the radar field of view other than the targets, such as from the ground). Conventional target simulators do not have the capability to generate targets embedded in clutter (called endo-clutter targets). They typically simulate clutter signals as a noise spectrum source separate from the targets, and then add the target signal. The targets are not embedded in the clutter spectrum. This, however, is not an accurate representation of a real world signal the radar might encounter in the field.

Hence, there is a need in the art for an improved system or method for generating simulated radar return signals having the capability to generate a large number of targets without excessive additional hardware, and to generate targets embedded in clutter.

SUMMARY OF THE INVENTION

The need in the art is addressed by the system and method for generating a simulated radar return signal of the present invention. The novel system includes a processor adapted to receive target and waveform parameters and in accordance therewith generate a composite digital signal, and a digital to analog converter adapted to convert the digital signal to an analog signal. The system also includes an upconverter adapted to convert the analog signal to radio frequency. The processor calculates time-domain digital data samples representing a composite radar return waveform based on the target and waveform parameters. These data samples are output at each time interval that the digital to analog converter samples data. The composite waveform can include returns from a large number of targets and from targets embedded in clutter. The system can also be adapted to test a radar system having multiple antenna ports by replicating the basic design for each port.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The novel target simulator of the present invention digitally synthesizes a number of radar received waveforms with complex targets of any type. The simulated waveform is a computer generated digital data stream that is converted to a low frequency analog signal and then coherently upconverted to the radar received signal frequency. This technique allows for providing a large number and variety of complex RF targets and radar waveforms where the number of radar return signals generated is not a function of the amount of hardware. This method is opposed to the current technique where each target is generated with individual RF hardware.

For the purposes of this description the term "target" is intended to include any signal that might be received by a radar system such as fixed targets, moving targets, ground clutter, interference signals, and equivalents as would be recognized by those skilled in the art.

Figure 1:
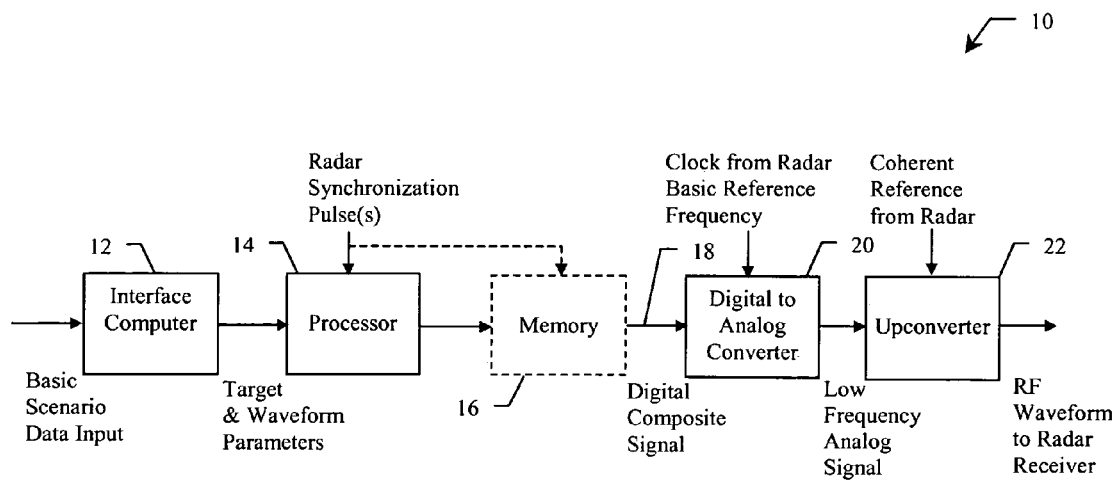
FIG. 1 is a simplified block diagram of an illustrative embodiment of a target synthesizer designed in accordance with the teachings of the present invention.

FIG. 1 is a simplified block diagram of an illustrative embodiment of a target synthesizer 10 for generating simulated radar return signals designed in accordance with the teachings of the present invention. The novel target synthesizer 10 includes an interface computer 12, a processor 14, a digital-to-analog converter (DAC) 20, and an RF upconverter 22. The interface computer 12 provides input data for the target(s) and the radar platform that defines the scenario for generation of the simulated radar return signals. The processor 14 uses the data from the interface computer 12 to generate a digital output that has the composite waveform and target data for the scenario. The digital output of the processor 14 is input to the DAC 20, which outputs a low frequency analog signal with the waveform and target data. The DAC analog output is then coherently upconverted to the radar received frequency by the RF upconverter 22.

Figure 2:
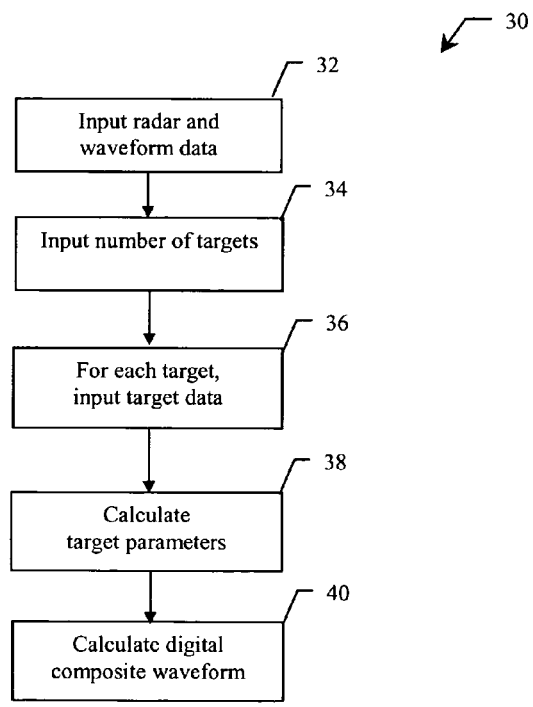
FIG. 2 is a simplified flow chart of an illustrative method for generating a digital composite radar return signal in accordance with the teachings of the present invention.

The basic scenario data that is the input to the interface computer 12 needs to establish all the data and parameters required to generate the digital composite radar return waveform. FIG. 2 is a simplified flow chart of an illustrative method 30 for generating a digital composite radar return signal in accordance with the teachings of the present invention.

At Step 32 of the illustrative method 30, input data about the radar system and transmitted waveform. The radar platform parameters such as velocity, altitude, antenna pointing, etc. are needed to determine the Doppler frequency added to the targets. In addition, waveform parameters such as type (which could be simple pulses, a frequency ramp, or any other complex waveform), frequency, pulse width, etc. are also required.

At Step 34, input the number of targets, and at Step 36, for each target, input the target data, such as type (which could be stationary, moving, clutter, signal source, or any other radar return signal), size, range, velocity, etc.

At Step 38, for each target, calculate the target parameters needed to generate the composite radar return waveform from the radar and target input data. A radar target can typically be specified by a range delay, a Doppler frequency, and an amplitude. These three target parameters can be calculated for a radar get from the radar and target input data. The digital composite radar return waveform can then be calculated versus time based on the target parameters and the waveform parameters.

The radar return signal from the ground contains signals that are delayed in time based on their range, and have a Doppler frequency based on the relative velocity between the radar platform and the ground. The pointing angle of the radar antenna also affects both the range delay and the Doppler frequency of all targets in the radar field of view, which is the area illuminated by the radar antenna pattern including the antenna mainlobe (mainbeam) and sidelobes. The fixed ground return signals with their associated Doppler frequency and range delay are called clutter signals, while large fixed targets are called discretes. Moving targets have relative ranges and Doppler frequencies that are greater or less than the clutter return depending on the moving targets' velocity. Thus, clutter signals can be represented as signals with a Doppler frequency at a specific radar range. They have a Doppler frequency and range change that depends on the radar platform's velocity. A moving target has a Doppler frequency and range change that depends on both the platform's velocity and the target's velocity.

Since moving targets and ground returns are both specified by the same generic range delay, Doppler, and amplitude parameters, both can be calculated. Clutter can be considered as a type of radar target return. The main difference between radar moving targets and clutter is the number of returns and the relative velocity of the moving targets. There are a large number of clutter returns compared to a fewer number of moving target returns. Thus, many clutter returns are needed to have a good representation of clutter since every point on the ground represents a clutter return.

Radar target returns can be from both stationary and moving targets. The simulated targets can be from anywhere in the radar field of view. In addition, the radar return simulation method of the present invention can generate interference signals, whether intentional or unintentional, such as a signal originating from a nearby aircraft. The target synthesis technique can provide all of the various types and numbers of radar return signals.

Returning to the illustrative method 30 of FIG. 2, at Step 40, calculate the time-domain digital data samples representing the composite radar return waveform based on the target parameters and waveform parameters. By using direct digital synthesis, a radar return signal can be defined by its carrier frequency and by its modulation content instant by instant. Each data point can assume one of $2^N$ amplitude values of an N-bit DAC 20. At each instant of time, a radar return waveform contains the target range, Doppler frequency, and amplitude, and the waveform frequency. When there are multiple targets, then the return waveform contains the range, Doppler frequency, and amplitude for all the targets verses time. Thus, based on a given radar platform, target and waveform scenario, a digital composite radar return waveform can be calculated.

In an illustrative embodiment, Steps 32 to 38 of the method 30 are implemented in software in the interface computer 12, and Step 40 is performed by the processor 14. The interface computer 12 and processor 14 can also be implemented using a single computer.

The processor 14 receives the target and waveform parameters from the interface computer 12 to generate in real time the complex received waveform at each time interval that the DAC 20 samples the data. The DAC sample rate needs to match the Nyquist requirements to produce an unambiguous analog low frequency waveform.

The processor 14 may not be able to keep up with the required DAC sample rate in real time. In this case, a large capacity memory 16 can be added to the target synthesizer 10. The scenario data can then be calculated off line, and the data loaded off line into the memory 16. The memory 16 can then send out the data to the DAC 20 for a given run time for the received radar signal scenario. Thus, the size of the memory 16 will determine the length of time that a scenario can be run.

The DAC 20 takes the digital composite data from the processor 14 (or memory 16) and outputs a low frequency analog complex received signal. This complex received signal includes all the target data such as range (or delay), Doppler frequency, target amplitude, etc. for targets in the antenna mainlobe or sidelobes. The complex signal has all of the data for all of the targets at a rate that can be sampled by the DAC 20 so as to produce an oversampled or unambiguous waveform. Thus, the input to the DAC 20 from the processor 14 (or memory 16) needs to come over a high speed interface or bus 18 that can send the data at least twice the DAC sample rate. In addition, the DAC 20 needs to operate at a high enough sample rate to be at least twice the frequency of the desired radar received waveform. The DAC 20 also needs a large dynamic range (number of bits) so output signal saturation does not occur.

The use of the memory 16 also allows actual recorded data to be used as the input to the DAC 20 and then the DAC output can be upconverted to the radar received frequency. Thus a radar on its platform can digitally record waveforms with target returns for use in radar testing. This use of recorded digital data of actual radar returns can thus replace the digitally synthesized data input to the DAC 20. The use of actual recorded data can provide more realistic radar return signals.

The signal out of the DAC 20 is a composite analog signal at a relatively low frequency. This DAC signal has all of the target(s) and waveform information. The signal then is upconverted to the radar received frequency by the upconverter 22 using coherent reference signals from the radar. This upconverted signal needs to be coherent with the radar and change frequency when the radar transmit frequency is changed. A coherent reference signal from the radar can be used by the upconverter 22 to mix the DAC output up to the radar frequency. Also, a reference signal from the radar is needed for the DAC clock or to generate the DAC clock so the DAC output will be locked to the radar timing.

A synchronization signal needs to be supplied by the radar each time a radar transmit signal pulse is sent out. This synchronization is needed so that the target synthesizer 30 knows when to start the processor 14 (or memory 16) to output the digital data so the received waveform can be processed by the radar. This synchronization pulse is used to keep the target synthesizer 30 synchronized to the radar pulse repetition frequency (prf). This synchronization pulse is sent to either the real time processor 14 or the memory 16 depending on which is used. When a memory 16 is used it is possible to send over just a start synchronization pulse and the data loaded in the memory 16 can be designed to stay locked to the radar prf given the radar reference clock frequency is stable.

Thus, the target synthesizer of the present invention provides an RF signal that emulates an actual radar received RF signal. The simulated signal can contain a large number of complex targets with Doppler frequency and range delay where these targets can be embedded in clutter. The invention synthesizes the output signal as a complex digital data stream that is then converted to an RF signal at the radar received frequency. The basic design can be adapted to have greater capability as DACs, digital memories, digital processors, and interconnecting digital buses are improved in the future.

Modern radar systems often employ multiple phase centers or antenna having multiple RF receivers and receive ports, allowing for more complex signal processing techniques. In this case, the data for return signals needs to be generated separately for each receive port. The target signal data generated for each port needs to be delayed in time relative to that receive port, antenna pointing angle and signal location. This occurs because the radar signal return will arrive at each of the antenna receive ports at a slightly different time depending on the target location and antenna pointing direction.

The target synthesizer of the present invention can have a number of separate basic sections, one section for each radar receiver port, so a different delay time, Doppler frequency and amplitude can be established for each received target signal going to each of the antenna received ports. This capability is important since it will allow radar testing of complex target and clutter scenarios where radar returns come from anywhere in the radar field of view. Thus, each of the basic components of the target synthesizer of FIG. 1 needs to be duplicated to have one set for each radar received port. This is shown in FIG. 3.

Figure 3:
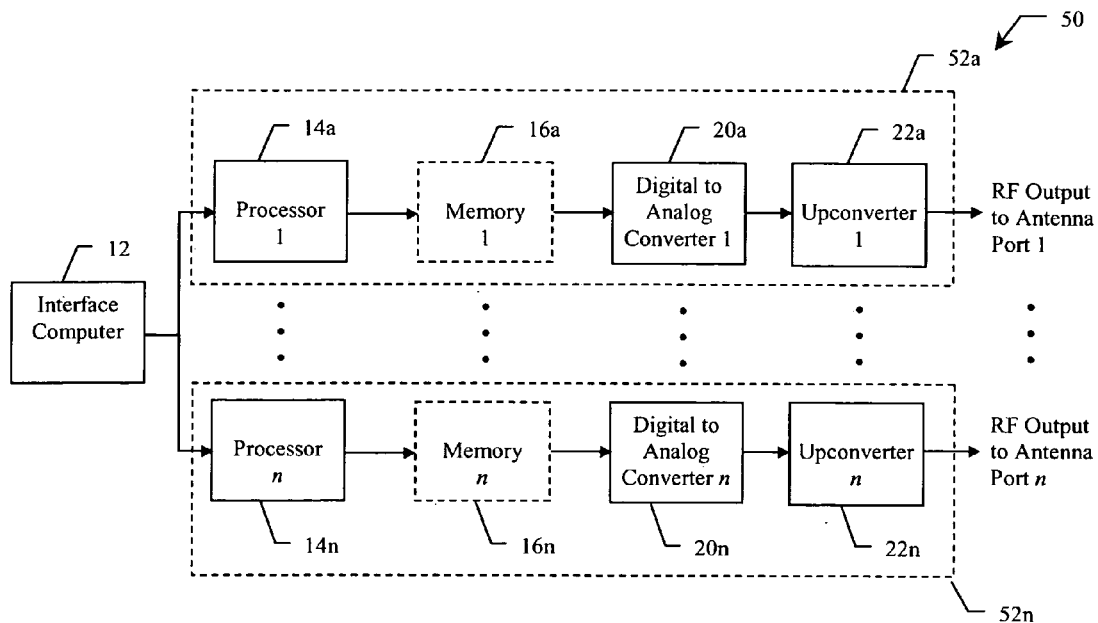
FIG. 3 is a simplified block diagram of an illustrative embodiment of a target synthesizer for n radar receiver ports designed in accordance with the teachings of the present invention.

FIG. 3 is a simplified block diagram of an illustrative embodiment of a target synthesizer 50 for n radar receiver ports designed in accordance with the teachings of the present invention. The system 50 includes n basic target synthesizer sections, labeled 52a to 52n, each adapted to synthesize a radar return signal for one of the n antenna ports of the radar. Each of the basic target synthesizer sections 52a to 52n includes a processor (labeled 14a to 14n), an optional memory (labeled 16a to 16n), a DAC (labeled 20a to 20n), and an RF upconverter (labeled 22a to 22n). An interface computer 12 supplies the target and waveform parameters to the processors 14a to 14n.

A return signal for each radar receiver port is generated by each basic section (52a to 52n) with delays obtained by delaying the signal data for each target in the radar field of view. Each processor (or memory output) in the basic section can generate targets that have the correct Doppler and are delayed by an amount that is a function of the radar pointing angle and target location in the radar field of view. Thus, target signal returns in both the mainlobe and sidelobes of the antenna can be generated.

There are some special cases of target scenarios where just one basic section of the target generator (as shown in FIG. 1) can be used and thus reduce the amount of hardware in the target generator unit. For each of these cases, the computer is still used to input the target scenario. One case is where the radar antenna has just one input received port. For that case one basic section can be used directly as it is. Another case is where one or more targets are located such that they are in the antenna main beam at the antenna boresight (dead ahead) of the radar antenna pointing direction.

When generating target returns that are only in the mainlobe of the radar antenna, one way to obtain the target signals that go to the radar received ports can be to generate one RF return signal using the basic hardware in FIG. 1 and then splitting the RF output of the basic section into as many RF signals as there are radar receivers. This is shown in FIG. 4.

Figure 4:
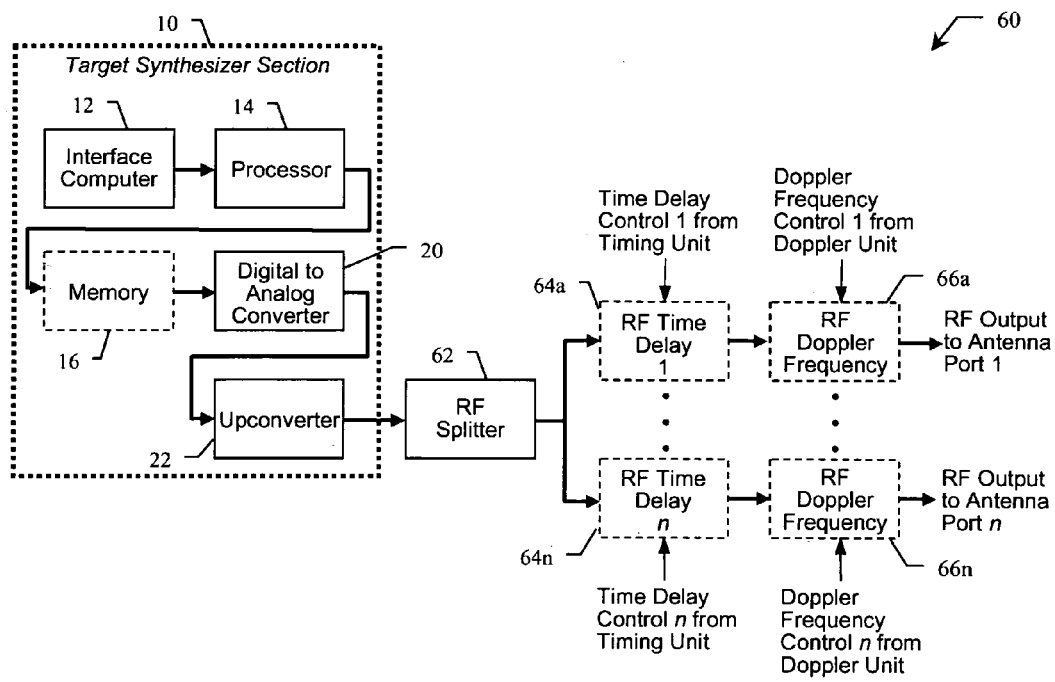
FIG. 4 is a simplified block diagram of an alternate embodiment of a target synthesizer for n radar receiver ports designed in accordance with the teachings of the present invention.

FIG. 4 is a simplified block diagram of an alternate embodiment of a target synthesizer 60 for n radar receiver ports using only one basic section designed in accordance with the teachings of the present invention. The system 60 includes a basic target synthesizer 10, as shown in FIG. 1, and an RF splitter 62 that splits the output of the synthesizer 10 into n signals. Each of the split outputs is then treated separately as discussed in the following.

For the case of a single target, then the exact output for each of the n ports can be obtained by using RF hardware time delays (labeled 64a to 64n for ports 1 to n, respectively) for applying a range delay, and frequency generators (labeled 66a to 66n for ports 1 to n, respectively) for applying a Doppler to each of the n outputs of the RF splitter 62. Each of the time delays 64a to 64n is controlled by a signal that sets the delay based on the radar antenna pointing angle. This delay time data could be calculated in a separate timing unit for each of the n outputs and then sent to each time delay 64a to 64n. Similarly, a Doppler control unit can be used to calculate the Doppler frequencies for the n outputs and send control signals to each of the frequency generators 66a to 66n.

For the case where there is more than one target, a very good approximation can be obtained by using the same range and Doppler values for all targets since the range and Doppler of the targets are all very nearly the same. Then the output of the basic target generator section 10, which is split using the RF coupler 62 that divides the output into n outputs, can respectively go to each one of the n ports of the radar antenna.

For both cases, each of the time delays 64a to 64n and Doppler generators 64a to 64n need to be programmed to output the correct or approximately correct range and Doppler verses time for each of the n ports. Thus the same values would be used for either the single or multiple target case. This will add complexity to the target generator system 60.

In addition, any target(s) off of boresight can be generated using conventional RF target generating hardware and the output(s) summed with the basic target generator output(s).

The target generator provides a radar return signal (where signal and target are used interchangeably) when a radar transmits an RF signal waveform. Some of the terms used in this description are discussed in this and the following paragraphs. The radar return from the ground contains signals called clutter that are delayed in time based on their range, and that have a Doppler frequency based on the relative velocity between the radar platform and the ground. The radar field of view is the total volume that the radar antenna can point to. It includes signal returns from the antenna mainlobe (mainbeam) and sidelobes. The pointing angle of the radar antenna affects both the range delay and the Doppler frequency of all targets in the radar field of view. The ground return signals with their associated Doppler frequency and range delay can be moving or fixed targets. Large fixed targets are called discretes. Moving targets have relative ranges and Doppler frequencies that are greater or less than the clutter return depending on the moving targets' velocity and direction. Clutter signals can be generated as signals with a Doppler frequency with a range delay. Many signals needed to be generated to represent the general ground return, where general means the ground return without the radar targets of interest, such as moving and certain fixed targets. They have a Doppler frequency and range change that depends on the radar platform's velocity.

Since clutter is the ground return that is produced whenever the antenna beam intercepts the ground, there are a very large number of clutter returns and these clutter needs to be modeled and used as one or more inputs to the radar "target" return scenario. The modeling of clutter can be simple or complex depending on how good a representation is needed.

A radar target can be specified by a range delay, a Doppler frequency and an amplitude. A moving target has a Doppler frequency and range change that depends on both the platforms' velocity and the target relative velocity. These three target parameters can be calculated for a radar target to generator target data based on a specified scenario. The radar return waveforms can be calculated verses time based on the target parameters and the waveform parameters. Thus, at each instant of time a radar return waveform contains the target range, Doppler frequency, amplitude, and the waveform frequency. When there are more than one target, then the return waveform at any instant of time will contain the range, Doppler frequency and amplitude for all the targets verses time. The target parameters need to be calculated so they can be sampled at a rate that meets the radar waveform Nyquist frequency requirements.

Thus, based on a given radar platform, target, clutter and waveform scenario, the radar return waveform parameters can be calculated. Also, since moving targets and ground return are both specified by the same generic range delay, Doppler and amplitude parameters, both can be calculated. As described above, clutter can be considered as a type of radar target return. The main difference between radar moving targets and clutter is the number of returns and the relative velocity of the moving targets. There are a large number of clutters returns compared to a fewer number of moving target returns. Thus, many clutter returns are needed to have a good representation of clutter, since every area on the ground in a radar resolution cell represents a clutter return.

The arbitrary waveform synthesis technique used in this radar signal generator is conceptually a signal generation method whereby time-domain digital data samples uniquely describe a waveform and target return profile. Each data point can assume one of $2^N$ amplitude values of an N-bit digital-to-analog converter. Using direct digital synthesis, a radar return signal can be defined by its carrier frequency and by its modulation content instant by instant.

Thus based on state-of-the-art technology, the radar return signal synthesizer technique of the present invention combines high-speed direct digital synthesis with analog upconversion to generate advanced signals for testing modern radar systems. The basic technique provides carrier frequencies anywhere within the radar frequency range and can be made to be fully coherent with the radar frequency over that range. Additionally, signals may have arbitrary AM, PM, FM, and pulse modulation with large instantaneous modulation bandwidth. The digitally-synthesized waveforms representing a large number of radar return signals (targets) provide an overall signal complexity, flexibility, and repeatability that is not achieved with traditional hardware based analog target generators.

Figure 5:
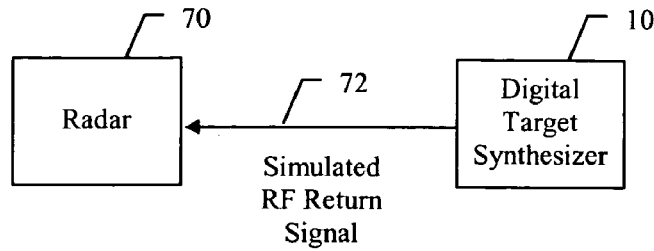
FIG. 5 is a simplified block diagram illustrating the use of a target synthesizer designed in accordance with the present teachings to test a radar system.

The target synthesizer technique described above can be used to test the receive side of a radar system, but it does not test its transmit signal. FIG. 5 is a simplified block diagram illustrating the use of a digital target synthesizer 10 designed in accordance with the present teachings to test a radar system 70. The RF signal generated by the target synthesizer is input to the radar 70 using an RF cable 72. The cable 72 goes to one radar antenna receive port. If the radar antenna has more than one receive port, then the target synthesizer 10 needs to have separate modules to generate the complex target returns for each antenna port, as described above, and each module needs a cable connected to the antenna receive port of the radar that the complete target scenario was generated for.

Figure 6:
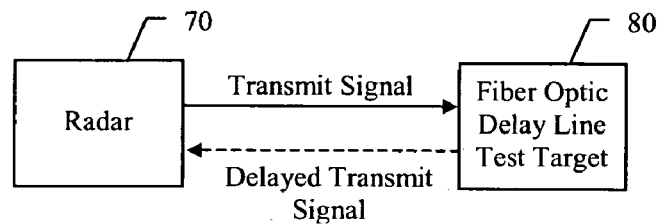
FIG. 6 is a simplified block diagram illustrating the use of a conventional radar test system designed to test the transmit signal of a radar system.

In contrast, FIG. 6 is a simplified block diagram illustrating the use of a conventional radar test system such as a fiber optic test target 80 designed to test the transmit signal of a radar system 70. The radar 70 generates a transmit signal that is received by the fiber optic test target 80, which subsequently sends a delayed version of the transmit signal back to the radar 70. Both signals can be transmitted over a short RF cable, or they can be radiated to the radar antenna.

Figure 7:
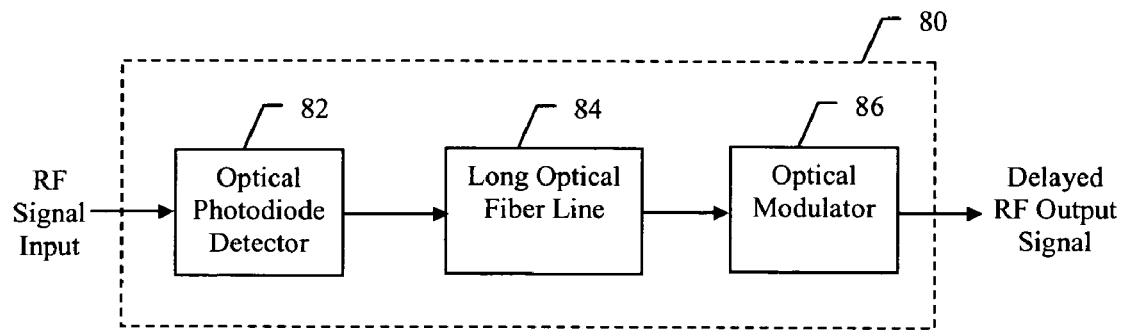
FIG. 7 is a simplified block diagram showing the components of a conventional fiber optic test target.

FIG. 7 is a simplified block diagram showing the components of a conventional fiber optic test target 80 as described in U.S. Pat. No. 4,903,029, entitled "DELAYED REPLICA RADAR TEST SET TARGET," the teachings of which are incorporated herein by reference. The system 80 includes an optical photodiode detector 82 for receiving the RF input signal, a long fiber optic line 84 for providing a delay, and an optical modulator 86 for transmitted the delayed RF output signal. The signal can be transmitted to the radar 70 (shown in FIG. 6) using a direct cable connection to the antenna receive port(s) or by radiating the signal to the radar antenna via an antenna horn coupled to the optical modulator 86 in the fiber optic test target 80.

The use of a fiber optic radar test target 80 provides the capability to generate a radar target return signal that ideally allows the radar 70 to independently test itself. The independent phase means that no other radar signals are needed for testing other than the radar transmit signal. The fiber optic test target 80, however, can only provide a single radar "target" return signal. Doppler, clutter and range delay can be added (mixed in with the basic RF return signal) for the target return signal to provide a composite radar target return to be used to test the radar transmit and receive functions, as described more fully in U.S. Pat. No. 5,177,488, entitled PROGRAMMABLE FIBER OPTIC DELAY LINE, AND RADAR TARGET SIMULATION SYSTEM INCORPO- RATING THE SAME, the teachings of which are incorporated herein by reference, but each target would need additional RF hardware.

A digital target synthesizer designed in accordance with the present teachings, on the other hand, can provide complex radar target return scenarios that have targets embedded in clutter, and can be used to generate radar returns for radar antenna with multiple receive ports. This is a very powerful capability for modern radars that perform complex signal processing.

Each type of test system has advantages for use in radar testing. The capabilities of a fiber optic test target can be combined with a digital target synthesizer to provide a complete system for radar testing.

Figure 8:
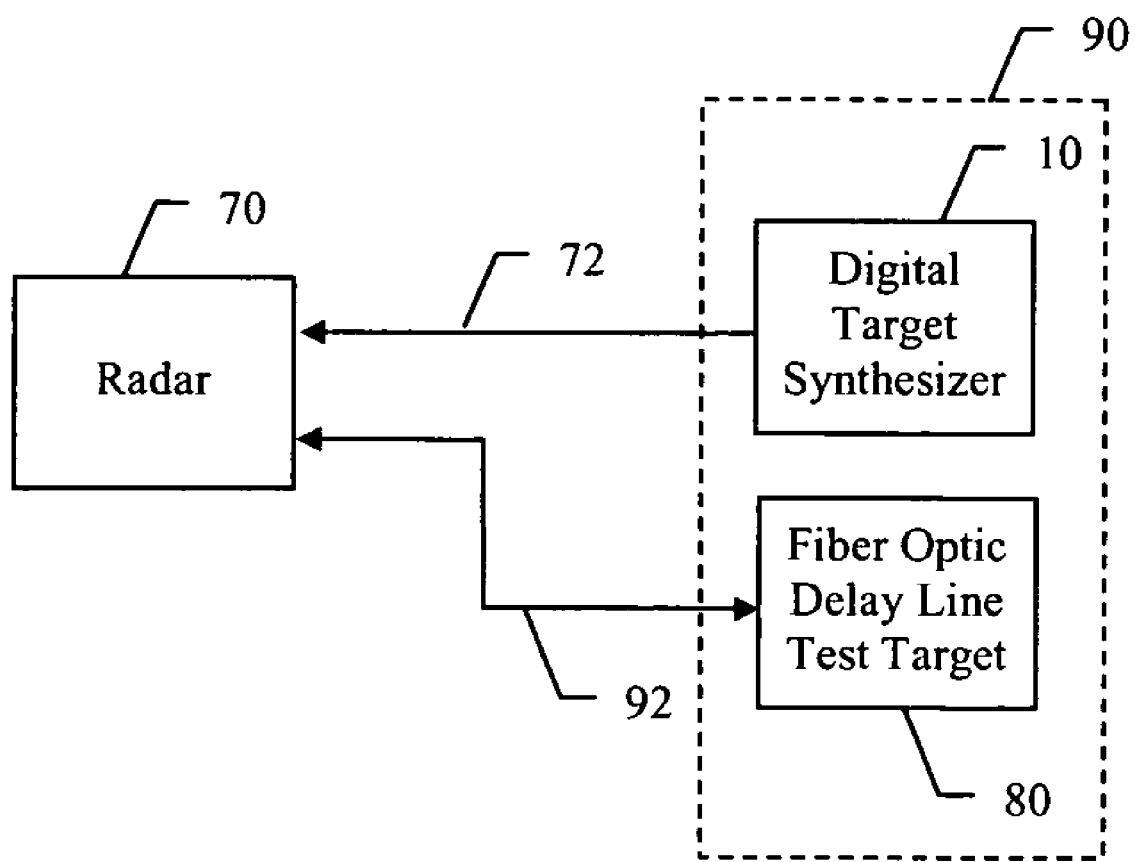
FIG. 8 is a simplified block diagram of an illustrative embodiment of a complete radar testing system designed in accordance with the teachings of the present invention.

FIG. 8 is a simplified block diagram of an illustrative embodiment of a complete radar testing system 90 designed in accordance with the teachings of the present invention. The complete test system 90 includes a digital target synthesizer 10, as described above for FIGS. 1, 3, and 4, and a fiber optic test target 80, as described above for FIG. 7. The RF output from the target synthesizer 10 is input to the radar 70 via an RF cable (or multiple cables if the radar 70 has multiple ports). The radar transmit signal is transmitted to the fiber optic test target 80, and the delayed transmit signal output from the fiber optic test target 80 is coupled to the radar 70 by a second RF cable 92. The two cables 72 and 92 are typically not connected at the same time. Each test is typically conducted separately by connecting each target generator to the radar at different times (i.e., not simultaneously). This complete testing system 90 can therefore be used to test both the transmit and receive paths of a radar system 70. Using computer control of both target generators their outputs could be summed at RF to generate a composite test scenario.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A target simulator for testing a radar system having n antenna ports comprising:
   a processor adapted to receive target and waveform parameters and in accordance therewith calculate time-domain digital data samples representing a composite radar return waveform;
   a digital to analog converter adapted to convert said digital samples to an analog signal
   an converter adapted to convert said analog signal to a radio frequency signal; and
   a radio frequency splitter adapted to split said radio frequency signal into n output signals.

2. The invention of claim 1 wherein said target simulator further includes first means for applying a delay to each of said n output signals.

3. The invention of claim 2 wherein said first means includes n radio frequency time delays, each delay adapted to delay one of said n output signals.

4. The invention of claim 1 wherein said target simulator further includes second means for applying a Doppler frequency to each of said n output signals.

5. The invention of claim 4 wherein said second means includes n frequency generators, each frequency generator adapted to apply a Doppler frequency to one of said n output signals.

* * * * *